United States Patent
McMillan et al.

(10) Patent No.: US 11,728,971 B2
(45) Date of Patent: *Aug. 15, 2023

(54) TECHNOLOGIES FOR SERIALIZABLE BINARY DATA DISTRIBUTION

(71) Applicant: Intel Corporation, Santa Clara, CA (US)

(72) Inventors: Alexander R. McMillan, Chandler, AZ (US); Deloy P. Bitner, Glendale, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,525

(22) Filed: Sep. 20, 2021

(65) Prior Publication Data
US 2022/0150049 A1 May 12, 2022

Related U.S. Application Data

(63) Continuation of application No. 16/306,143, filed as application No. PCT/US2016/040363 on Jun. 30, 2016, now Pat. No. 11,128,444.

(51) Int. Cl.
*H04L 9/06* (2006.01)
*G06F 16/907* (2019.01)
(Continued)

(52) U.S. Cl.
CPC ............ *H04L 9/065* (2013.01); *G06F 16/907* (2019.01); *G06F 16/9035* (2019.01); *H04L 9/0618* (2013.01); *H04L 9/32* (2013.01)

(58) Field of Classification Search
CPC ....... H04L 63/08; H04L 9/065; H04L 9/0618; H04L 9/32; H04L 9/321; H04L 9/06; G06F 16/907; G06F 16/908; G06F 16/9035
See application file for complete search history.

(56) References Cited

U.S. PATENT DOCUMENTS

| | | | |
|---|---|---|---|
| 6,785,688 B2 | 8/2004 | Abajian et al. | |
| 7,574,523 B2 * | 8/2009 | Traversal | H04L 67/34 709/227 |

(Continued)

OTHER PUBLICATIONS

International Searching Authority, "Search Report and Written Opinion," issued in connection with International Patent Application No. PCT/US2016/040363, dated Mar. 28, 2017, 8 pages.

(Continued)

*Primary Examiner* — Hosuk Song
(74) *Attorney, Agent, or Firm* — Hanley, Flight & Zimmerman, LLC

(57) ABSTRACT

Technologies for binary data distribution include a source computing device and a recipient computing device. The source computing device profiles a binary file payload to generate a payload fingerprint and generates a text-encoded payload as a function of the binary file payload. The source computing device combines the text-encoded payload and metadata including the payload fingerprint to generate a message data structure, and serializes the message data structure to generate a serialized message. The source computing device may sign the text-encoded payload and the metadata to generate a signature included in the serialized message. The source computing device transmits the serialized message to the recipient computing device, which loads the text-encoded payload and the payload fingerprint from the serialized message, decodes the text-encoded payload to recover the binary file payload, and verifies the binary file payload with the payload fingerprint. Other embodiments are described and claimed.

20 Claims, 5 Drawing Sheets

(51) Int. Cl.
*H04L 9/32* (2006.01)
*G06F 16/9035* (2019.01)

(56) References Cited

U.S. PATENT DOCUMENTS

| | | |
|---|---|---|
| 7,720,836 B2 | 5/2010 | Abajian et al. |
| 7,730,142 B2 | 6/2010 | LeVasseur et al. |
| 9,106,697 B2 | 8/2015 | Capalik et al. |
| 9,210,178 B1 * | 12/2015 | Roth .................... H04L 63/105 |
| 9,424,564 B2 * | 8/2016 | Bradley ................ G06F 16/951 |
| 9,917,821 B2 * | 3/2018 | Gillmore .............. H04L 63/067 |
| 10,313,410 B2 * | 6/2019 | Bullotta ................ H04L 65/60 |
| 10,476,907 B2 * | 11/2019 | Hittel ................... H04L 63/145 |
| 11,128,444 B2 | 9/2021 | McMillan et al. |
| 11,190,540 B2 * | 11/2021 | Hittel ................. H04L 63/1433 |
| 2009/0249277 A1 | 10/2009 | Prakash |
| 2011/0258315 A1 | 10/2011 | Whitmore et al. |
| 2012/0179840 A1 | 7/2012 | Belanger et al. |
| 2013/0054535 A1 | 2/2013 | Ledoux et al. |
| 2013/0139148 A1 | 5/2013 | Berg et al. |
| 2015/0281747 A1 | 10/2015 | Gonder et al. |
| 2016/0314461 A1 | 10/2016 | Barnett et al. |

OTHER PUBLICATIONS

International Searching Authority, "International Preliminary Report on Patentability," issued in connection with International Patent Application No. PCT/US2016/040363, dated Jan. 1, 2019, 6 pages.
United States Patent and Trademark Office, "Non-Final Office Action," issued in connection with U.S. Appl. No. 16/306,143, dated Jan. 25, 2021, 7 pages.
United States Patent and Trademark Office, "Notice of Allowance and Fee(s) Due," issued in connection with U.S. Appl. No. 16/306,143, dated May 19, 2021, 7 pages.

* cited by examiner

TECHNOLOGIES FOR SERIALIZABLE BINARY DATA DISTRIBUTION

CROSS-REFERENCE TO RELATED APPLICATIONS

This patent arises from a continuation of U.S. patent application Ser. No. 16/306,143 filed Nov. 30, 2018, entitled "TECHNOLOGIES FOR SERIALIZABLE BINARY DATA DISTRIBUTION," which is a National Stage Entry of PCT Patent Application No. PCT/US2016/040363, filed Jun. 30, 2016, entitled "TECHNOLOGIES FOR SERIALIZABLE BINARY DATA DISTRIBUTION." The contents of these applications are hereby incorporated herein by reference in their entireties.

BACKGROUND

Distribution of binary files such as libraries, executables, and applications is a typical activity for current computing systems. For example, an updated application binary may be provisioned and/or installed to multiple remote computing systems by a software developer, distributor, and/or system administrator. Typically, binary files are distributed using binary package files such as Debian packages (.deb files), RPM Package Manager files (rpm files). Microsoft® Windows® installer packages (.msi files), cabinet files (.cab files), or other binary package file formats. Generating a package file for distribution typically requires configuring and using a build environment (e.g., an integrated development environment or other software development environment) to generate the package file. Generated binary package files are typically operating-system dependent.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
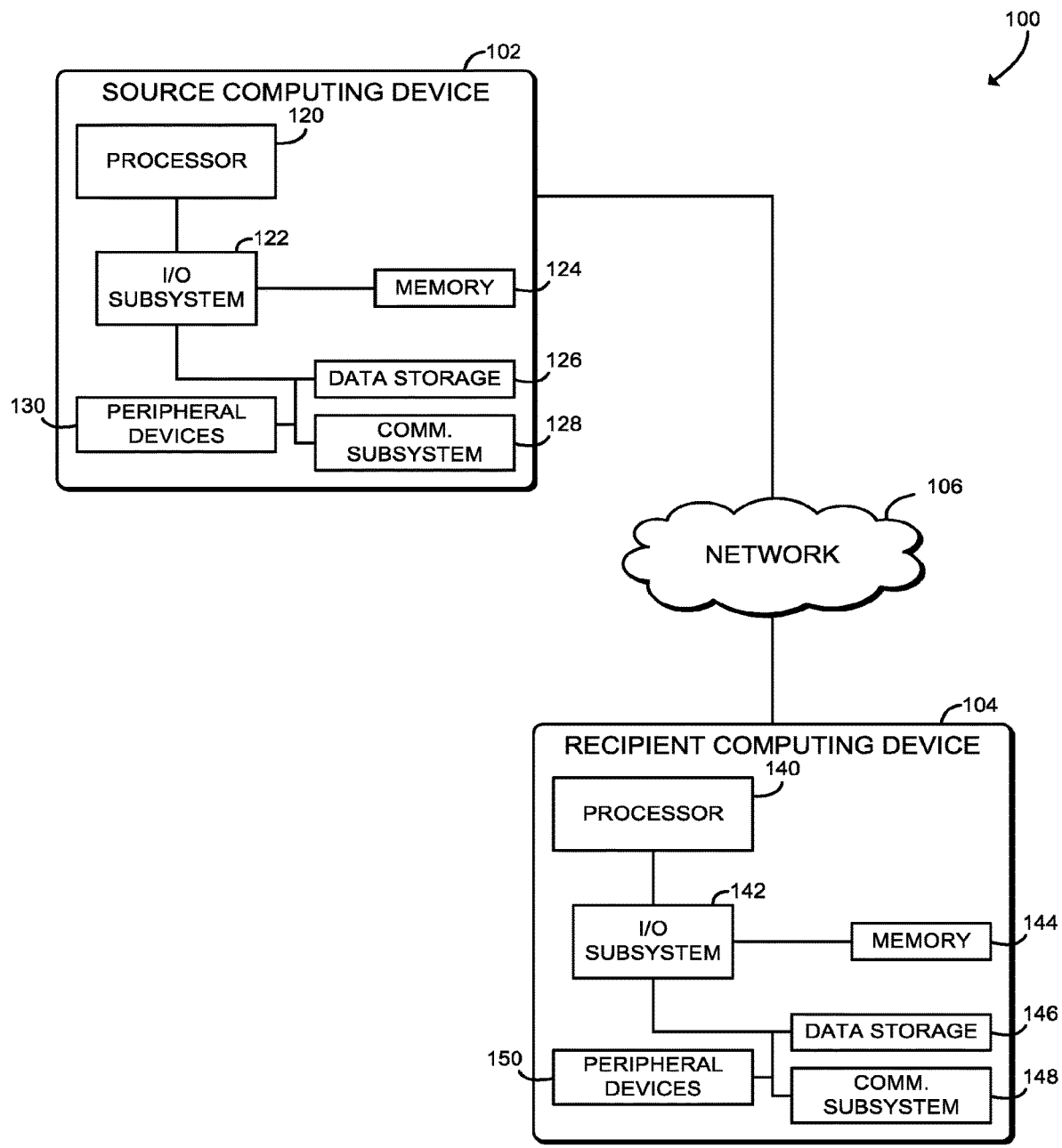
FIG. 1 is a simplified block diagram of at least one embodiment of a system for binary data distribution.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment, may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required m all embodiments and, in some embodiments, may not be included or may be combined with other features.

Referring now to FIG. 1, in an illustrative embodiment, a system 100 for serializable binary data distribution includes a source computing device 102 and a recipient computing device 104 in communication over a network 106. In use, as described further below, the source computing device 102 generates a text-encoded representation of a binary file payload and profiles the binary file payload to generate a payload fingerprint. The payload fingerprint may be aggregated with other, user-supplied metadata. The text-encoded payload and metadata may be signed over to generate a signature, which is included with the text-encoded payload and metadata in a message data structure. The message data structure is serialized and transmitted over the network 106 to the recipient computing device 104. The recipient computing device 104 receives the serialized message and may decode and verify the binary file payload. Thus, the system 100 may allow binary files to be distributed without requiring a complicated build system to generate a specialized binary distribution package. The serialized message may be decoded by any device that understands the serialization format of the message and the text-encoding format of the payload (e.g., by including appropriate libraries) and may not require the use of any particular operating system. Furthermore, the serialized message may be decoded by small or low-powered computing devices with limited computing resources. Additionally, although illustrated as including a single source computing device 102 and recipient computing device 104, it should be understood that in some embodiments, the system 100 may include multiple source computing devices 102 and/or recipient computing devices 104.

The source computing device 102 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. As shown in FIG. 1, the source computing device 102 illustratively includes a processor 120, an input/output subsystem 122, a memory 124, a data storage device 126, and a communication subsystem 128. Of course, the source computing device 102 may include other or additional components, such as those commonly found in a server (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the source computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the source computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processors 120, the memory 124, and other components of the source computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. As described further below, the data storage device 126 may store binary file payloads and/or serialized data messages.

The communication subsystem 128 of the source computing device 102 may be embodied as any communication circuit, device, or collection thereof, capable of enabling communications between the source computing device 102, the recipient computing device 104, and/or other remote devices over the network 106. The communication subsystem 128 may be configured to use any one or more communication technology (e.g., wired or wireless communications) and associated protocols (e.g., Ethernet, Bluetooth®, WiMAX, etc.) to effect such communication.

The recipient computing device 104 may be embodied as any type of computation or computer device capable of performing the functions described herein, including, without limitation, a mobile computing device, an embedded computing device, a smart phone, a computer, a laptop computer, a notebook computer, a tablet computer, a wearable computing device, a server, a network appliance, a web appliance, a distributed computing system, a processor-based system, and/or a consumer electronic device. Thus, the recipient computing device 104 includes components and devices commonly found in an internee-connected device or similar computing device, such as a processor 140, an I/O subsystem 142, a memory 144, a data storage device 146, a communication subsystem 148, and/or other peripheral devices. Those individual components of the recipient computing device 104 may be similar to the corresponding components of the source computing device 102, the description of which is applicable to the corresponding components of the recipient computing device 104 and is not repeated herein so as not to obscure the present disclosure.

As discussed in more detail below, the source computing device 102 and the recipient computing device 104 may be configured to transmit and receive data with each other and/or other devices of the system 100 over the network 106. The network 106 may be embodied as any number of various wired and/or wireless networks. For example, the network 106 may be embodied as, or otherwise include, a wired or wireless local area network (LAN), a wired or wireless wide area network (WAN), a cellular network, and/or a publicly-accessible, global network such as the Internet. As such, the network 106 may include any number of additional devices, such as additional computers, routers, and switches, to facilitate communications among the devices of the system 100.

Figure 2:
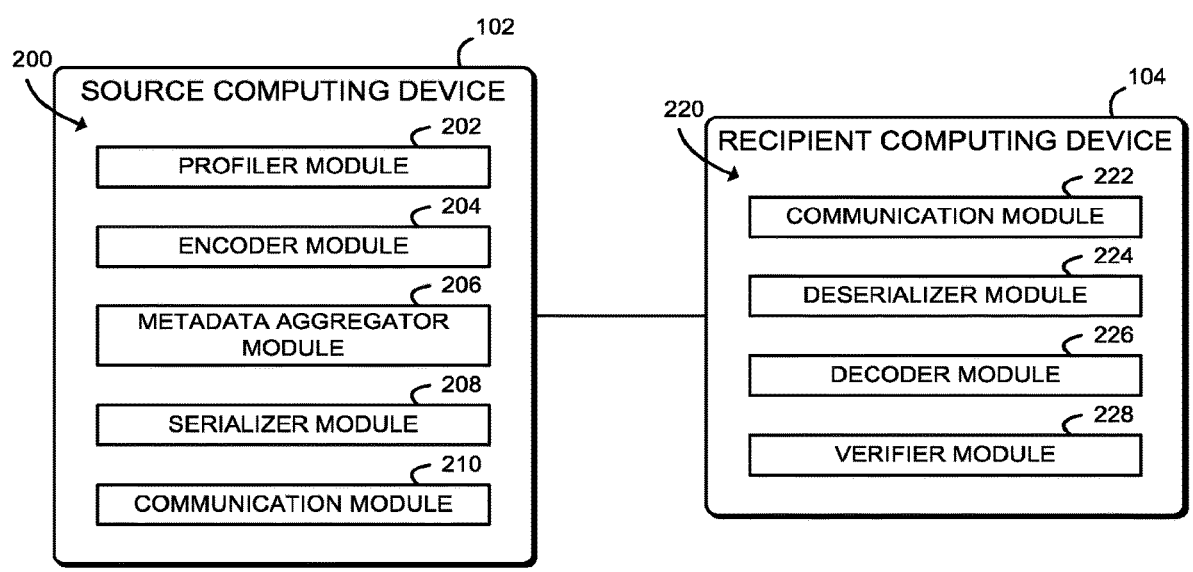
FIG. 2 is a simplified block diagram of at least one embodiment of various environments that may be established by the system of FIG. 1.

Referring now to FIG. 2, in an illustrative embodiment, the source computing device 102 establishes an environment 200 during operation. The illustrative environment 200 includes a profiler module 202, an encoder module 204, a metadata, aggregator module 206, a serializer module 208, and a communication module 210. The various modules of the environment 200 may be embodied as hardware, firmware, software, or a combination thereof. As such, in some embodiments, one or more of the modules of the environment 200 may be embodied as circuitry or collection of electrical devices (e.g., profiler circuitry 202, encoder circuitry 204, metadata aggregator circuitry 206, serializer circuitry 208, and/or communication circuitry 210). It should be appreciated that, in such embodiments, one or more of the profiler circuitry 202, the encoder circuitry 204, the metadata aggregator circuitry 206, the serializer circuitry 208, and/or the communication circuitry 210 may form a portion of one or more of the processor 120, the I/O subsystem 122, and/or other components of the source computing device 102. Additionally, in some embodiments, one or more of the illustrative modules may form a portion of another module and/or one or more of the illustrative modules may be independent of one another.

The profiler module 202 is configured to profile a binary file payload to generate a payload fingerprint. The payload fingerprint may be embodied as any unique code or other data that may be used as an identity of the binary file payload such as a hash and/or checksum. As described further below, the payload fingerprint may be used to verify that the binary file payload has not been modified or otherwise tampered with. The encoder module 204 is configured to generate a text-encoded payload as a function of the binary file payload. The text-encoded payload is a text representation of the binary file payload. In some embodiments, generating the text-encoded payload may be performed by one or more specialized hardware components.

The metadata aggregator module 206 is configured to combine the text-encoded payload and the payload fingerprint to generate a message data structure. The metadata aggregator module 206 may be further configured to combine the payload fingerprint with user-supplied metadata to generate aggregated metadata, and combining the text-encoded payload and the payload fingerprint may include combining the text-encoded payload and the user-supplied metadata. The user-supplied metadata may be embodied as binary or textual metadata such as an identifier of the recipient computing device 104, an identifier of the source computing device 102, a date of generation, or a command associated with the binary file payload. In some embodiments, the metadata aggregator module 206 may be configured to combine the text-encoded payload and the payload fingerprint to generate a data protection block, sign over the data protection block to generate a cryptographic signature of the data protection block, store the cryptographic signature in a signature block, and combine the data protection block and the signature block to generate the message data structure. In some embodiments, generating the cryptographic signature may be performed by one or more specialized hardware components such as a cryptographic accelerator, for example a trusted platform module (TPM), a security co-processor, or other cryptographic accelerator.

In some embodiments, the encoder module 204 may be further configured to encrypt the binary file payload to generate an encrypted payload. In those embodiments, generating the text-encoded payload as a function of the binary file payload may include generating the text-encoded payload as a function of the encrypted payload, and the text-encoded payload is a text representation of the encrypted payload. Additionally or alternatively, in some embodiments the encoder module 204 may be further configured to encrypt the text-encoded payload to generate an encrypted text-encoded payload. In those embodiments, combining the text-encoded payload and the payload fingerprint to generate the message data structure may include combining the encrypted text-encoded payload and the payload fingerprint to generate the message data structure.

The serializer module 208 is configured to serialize the message data structure to generate a serialized message. In some embodiments, serializing the message data structure may be performed by one or more specialized hardware components. The communication module 210 is configured to transmit the serialized message to a recipient computing device 104.

Still referring to FIG. 2, in the illustrative embodiment, the recipient computing device 104 establishes an environment 220 during operation. The illustrative environment 220 includes a communication module 222, a deserializer module 224, a decoder module 226, and a verifier module 228. The various modules of the environment 240 may be embodied as hardware, firmware, software, or a combination thereof. As such, in some embodiments, one or more of the modules of the environment 220 may be embodied as circuitry or collection of electrical devices (e.g., communication circuitry 222, deserializer circuitry 224, decoder circuitry 226, and/or verifier circuitry 228). It should be appreciated that, in such embodiments, one or more of the communication circuitry 222, the deserializer circuitry 224, the decoder circuitry 226, and/or the verifier circuitry 228 may form a portion of one or more of the processor 140, the I/O subsystem 142, and/or other components of the recipient computing device 104. Additionally, in some embodiments, one or more of the illustrative modules may form a portion of another module and/or one or more of the illustrative modules may be independent of one another.

The communication module 222 is configured to receive a serialized message from the source computing device 102. The deserializer module 224 is configured to deserialize and load one or more fields of the serialized message. The deserializer module 224 is configured to load a text-encoded payload into the memory 144 of the recipient computing device 104 from a payload field of the serialized message, and to load a payload fingerprint into the memory 144 of the recipient computing device 104 from a payload fingerprint field of the serialized message. The deserializer module 224 may be further configured to load user-supplied metadata into the memory 144 of the recipient computing device 104 from a user-supplied metadata field of the serialized message. The user-supplied metadata may be embodied as textual or binary metadata such as an identifier of the recipient computing device 104, an identifier of the source computing device 102, a date of generation, or a command associated with a binary file payload. In some embodiments, deserializing the message data structure may be performed by one or more specialized hardware components.

The decoder module 226 is configured to decode the text-encoded payload to recover a binary file payload in response to loading the text-encoded payload. In some embodiments, decoding the text-encoded payload to recover the binary file payload may include decoding the text-encoded payload to generate an encrypted payload and decrypting the encrypted payload to recover the binary file payload. Additionally or alternatively, in some embodiments decoding the text-encoded payload to recover the binary file payload may include decrypting the text-encoded payload to generate a decrypted text-encoded payload and decoding the decrypted text-encoded payload to recover the binary file payload. In some embodiments, decoding the text-encoded payload may be performed by one or more specialized hardware components.

The verifier module 228 is configured to verify the binary file payload with the payload fingerprint. Verifying the binary file may include profiling the binary file payload to generate a payload fingerprint and comparing the payload fingerprint from the serialized message to the generated payload fingerprint. The verifier module 228 may be further configured to verify a data protection block of the serialized message with a signature block of the serialized message. The data protection block includes the text-encoded payload field, the payload fingerprint field, and any included metadata, and the signature block includes a cryptographic signature generated from the data in the data protection block. In some embodiments, verifying the cryptographic signature may be performed by one or more specialized hardware components such as a cryptographic accelerator.

Figure 3:
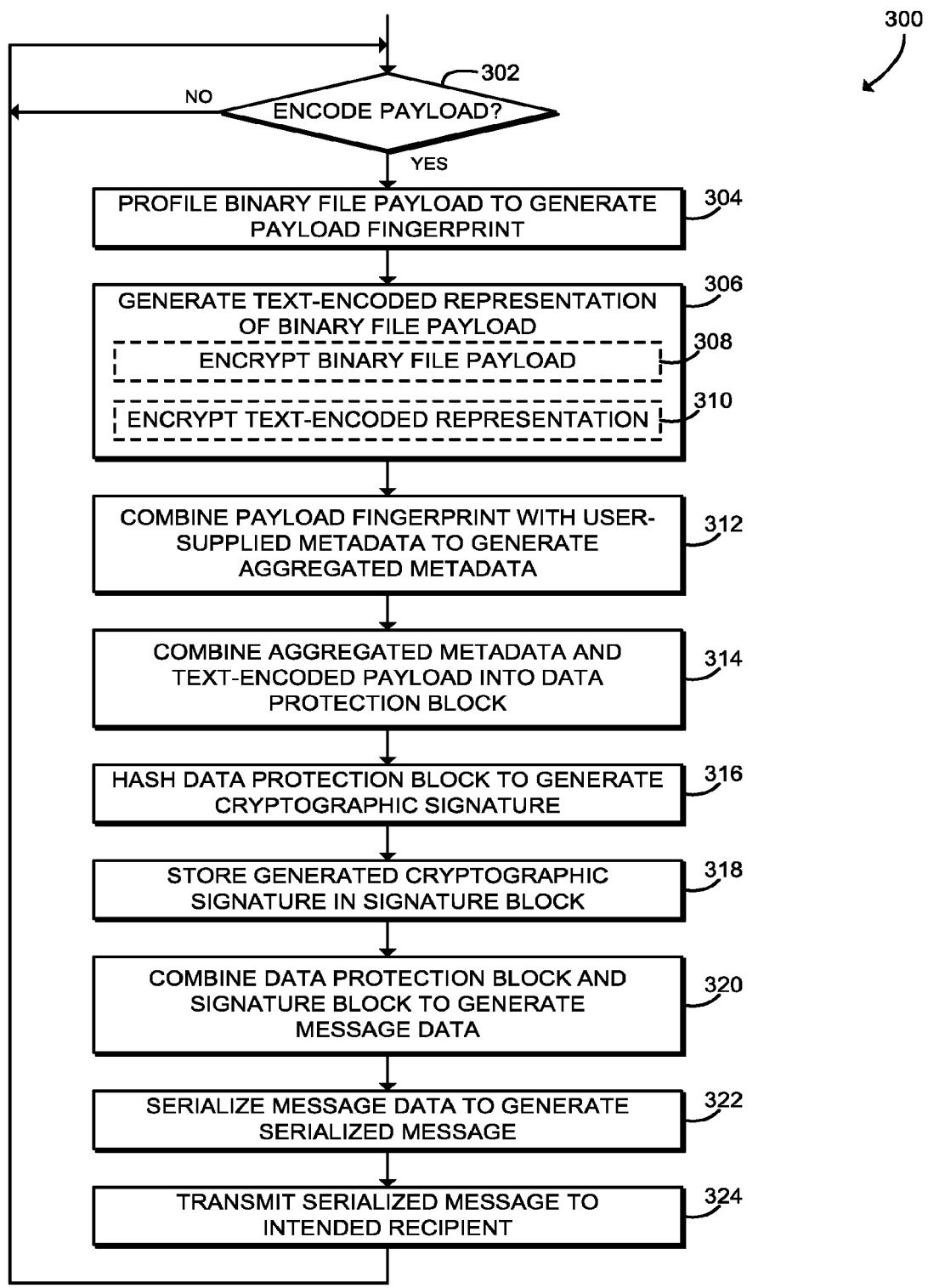
FIG. 3 is a simplified flow diagram of at least one embodiment of a method for binary data transmission that may be executed by a source computing device of FIGS. 1 and 2.

Referring now to FIG. 3, in use, the source computing device 102 may execute a method 300 for transmitting binary data. It should be appreciated that, in some embodiments, the operations of the method 300 may be performed by one or more modules of the environment 200 of the source computing device 102 as shown in FIG. 2. Additionally or alternatively, in some embodiments, the method 300 may be embodied as various instructions stored on a computer-readable media, which may be executed by the processor 120 and/or other components of the source computing device 102 to cause the source computing device 102 to perform the method 300. The computer-readable media may be embodied as any type of media capable of being read by the source computing device 102 including, but not limited to, the memory 124, the data storage device 126, other memory or data storage devices of the source computing device 102, portable media readable by a peripheral device of the source computing device 102, and/or other media.

The method 300 begins with block 302, in which the source computing device 102 determines whether to encode and transmit a binary file payload. For example, the source computing device 102 may encode a binary file payload in response to a user command, network request from a recipient computing device 104, an update to the binary file payload, or other event. If the source computing device 102 determines not to encode and transmit the binary file payload, the method 300 loops back to block 302 to continue determining whether to transmit binary data. If the source computing device 102 determines to encode and transmit a binary file payload, the method 300 advances to block 304.

In block 304, the source computing device 102 profiles the binary file payload to generate a payload fingerprint. The payload fingerprint may be embodied as any unique code or other data that may be used as an identity of the binary file payload. For example, the source computing device 102 may generate a hash of the binary file payload using a hash function or generate a checksum for the binary file payload.

In block 306, the source computing device 102 generates a text-encoded representation of the binary file payload. The source computing device 102 may use any appropriate technique for converting the binary file payload into a text representation, such as base-64, uuencode, or other techniques. In some embodiments, in block 308 the source computing device 102 may encrypt the binary file payload prior to generating the text-encoded representation. For example, the source computing device 102 may encrypt the binary file payload to generate an encrypted payload, which is also binary-coded data, and then convert the encrypted payload to the text-encoded representation. In some embodiments, in block 310 the source computing device 102 may encrypt the text-encoded representation of the binary file payload to generate an encrypted text-encoded representation. To encrypt the text-encoded representation, the source computing device 102 may use any encryption technique that accepts text-encoded plaintext input and generates text-encoded cipher text output.

In block 312, the source computing device 102 combines the payload fingerprint with any user-supplied metadata to generate aggregated metadata. The user-supplied metadata may include, for example, an identifier of the source computing device 102, an identifier of the recipient computing device 104, a date and/or time that the payload file was generated, a signature of the binary file payload, a command to be performed by the recipient computing device 104 in relation to the payload, or other metadata. For example, the command may include a command to install, update, or replace a particular file or other data object. The user-supplied metadata and the aggregated metadata may be formatted in any appropriate text-encoded format.

In block 314, the source computing device 102 combines the text-encoded payload and the aggregated metadata into a data protection block. The data protection block may be embodied as any object, structure, array, or other in-memory data structure capable of storing the text-encoded payload and the aggregated metadata. In particular, the text-encoded payload and the aggregated metadata (and/or the individual metadata items of the aggregated metadata) may be embodied as sections and/or fields of the data protection block.

In block 316, the source computing device 102 signs over the data protection block to generate a cryptographic signature. As described further below, the cryptographic signature may be used to verify the integrity and/or authenticity of the contents of the data protection block (including the text-encoded payload, the payload fingerprint, and the user-supplied metadata). The source computing device 102 may use any cryptographic signature algorithm and associated cryptographic keys to generate the cryptographic signature. In block 318, the source computing device 102 stores cryptographic signature in a signature block. The signature block, similar to the data protection block, may be embodied as any object, structure, array, or other in-memory data structure.

In block 320, the source computing device 102 combines the data protection block and the signature block to generate a combined message data structure. Similar to the data protection block and/or the signature block, the message data structure may be embodied as any object, structure, array, or other in-memory data structure. In particular, the data protection block and the signature block (and/or the individual metadata items of the aggregated metadata) may be embodied as sections and/or fields of the message data structure.

In block 322, the source computing device 102 serializes the message data structure to generate a serialized message. The serialized message may be embodied as structured or unstructured text data, and may be generated using any appropriate serialization format, such as ASN.1, JSON/YAML, BSON, XML, or other serialization format. The serialized message may be output to a stream, a file, or other communication facility of the source computing device 102.

In block 324, the source computing device 102 transmits the serialized message to the intended recipient computing device 104. The source computing device 102 may transmit the serialized message via the network 106, using any appropriate transmission protocol. The recipient computing device 104 may decode and verify the serialized message as described below in connection with FIG. 5. After transmitting the serialized message, the method 300 loops back to block 302, in which the source computing device 102 may continue distributing binary data.

Figure 4:
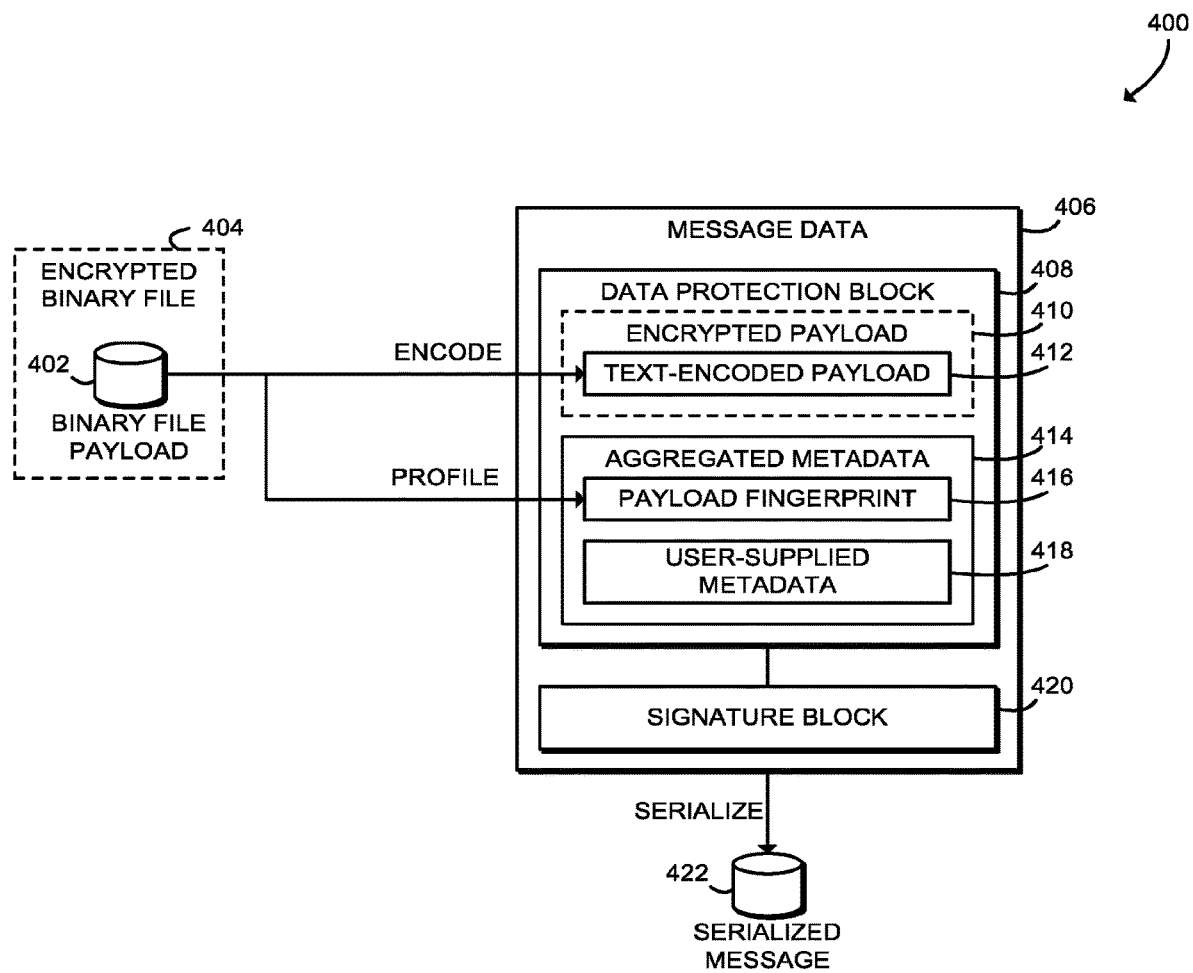
FIG. 4 is a schematic diagram of at least one embodiment of a message data structure that may be processed by the system of FIGS. 1 and 2.

Referring now to FIG. 4, diagram 400 illustrates at least one potential embodiment of a binary file payload 402, a message data structure 406, and a serialized message 422. As shown, the message data 406 includes a data protection block 408 and a signature block 420. The data protection block 408 includes a text-encoded payload 412 and aggregated metadata 414. The aggregated metadata 414 includes a payload fingerprint 416 and user-supplied metadata 418. The signature block 420 includes a cryptographic signature generated over the data protection block 408, As shown, the entire message data 406 may be serialized to generate the serialized message 422.

As further shown in FIG. 4, the binary file payload 402 may be encoded to generate the text-encoded payload 412. The binary file payload 402 may also be profiled to generate the payload fingerprint 416. In some embodiments, the binary file payload 402 may be encrypted to generate an encrypted binary file 404, and the encrypted binary file 404 may be encoded to generate the text-encoded payload 412. Additionally or alternatively, in some embodiments, the text-encoded payload 412 may be encrypted to generate encrypted payload 410. The encrypted payload 410 is included in the data protection block 408 and thus is signed over by the signature block 420.

Figure 5:
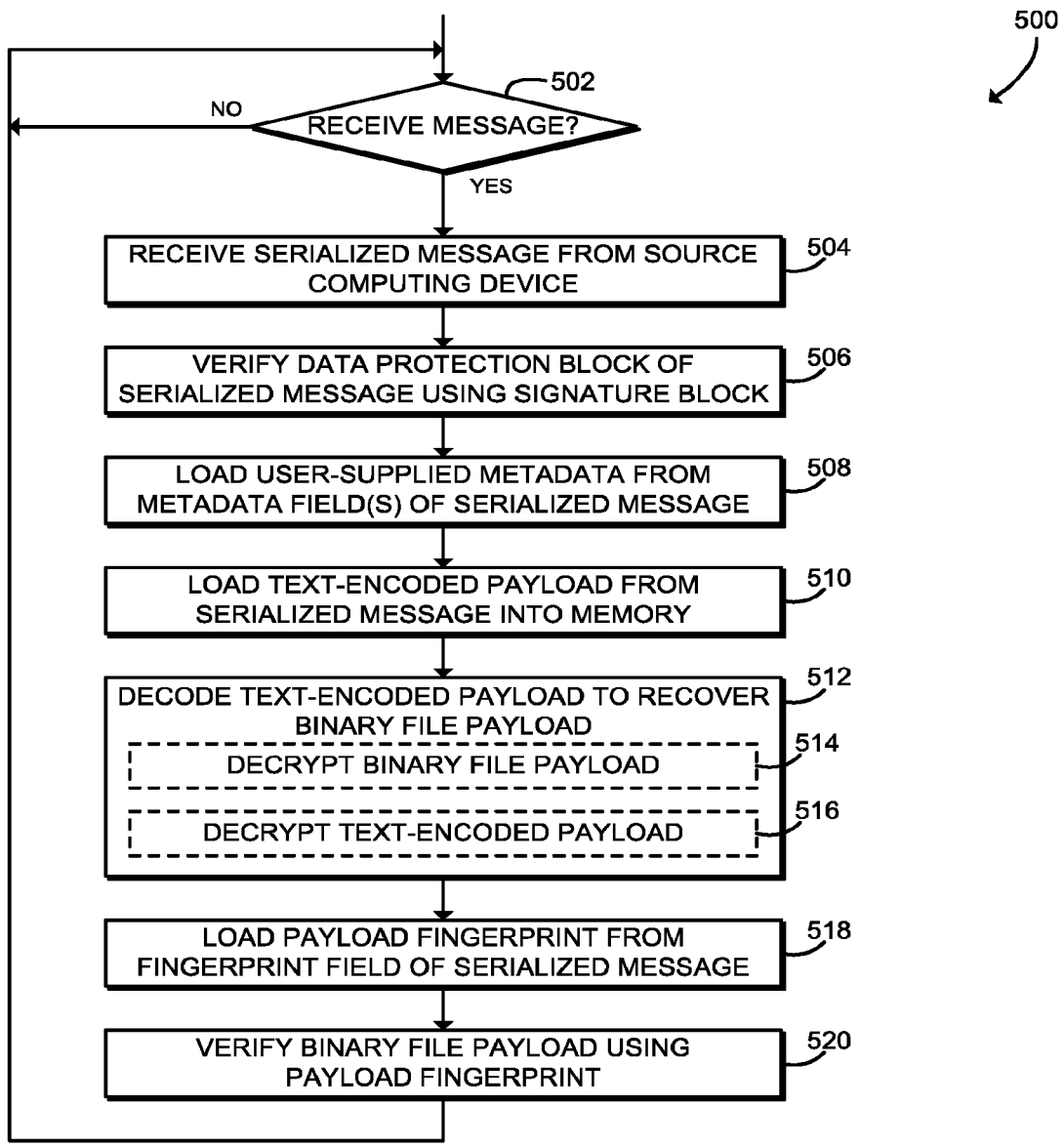
FIG. 5 is a simplified flow diagram of at least one embodiment of a method for binary data reception that may be executed by a recipient computing device of FIGS. 1 and 2.

Referring now to FIG. 5, in use, the recipient computing device 104 may execute a method 500 for receiving binary data. It should be appreciated that, in some embodiments, the operations of the method 500 may be performed by one or more modules of the environment 220 of the recipient computing device 104 as shown in FIG. 2. Additionally or alternatively, in some embodiments, the method 500 may be embodied as various instructions stored on a computer-readable media, which may be executed by the processor 140 and/or other components of the recipient computing device 104 to cause the recipient computing device 104 to perform the method 500. The computer-readable media may be embodied as any type of media capable of being read by the recipient computing device 104 including, but not limited to, the memory 144, the data storage device 146, other memory or data storage devices of the recipient computing device 104, portable media readable by a peripheral device of the recipient computing device 104, and/or other media.

The method 500 begins with block 502, in which the recipient computing device 104 determines whether to receive a serialized message from the source computing device 102. The recipient computing device 104 may receive a serialized message in response to a user command, listen for serialized messages pushed from the source computing device 102, poll the source computing device 102 for available serialized messages, or otherwise determine whether to receive a serialized message from the source computing device 102. In some embodiments, the recipient computing device 104 may receive a serialized message in response to a command included in a previously received serialized message, for example as part of the user-defined metadata of the previously received serialized message. In those embodiments, the metadata of the previously received serialized message may identify the source computing device 102 and/or the binary file payload associated with the serialized message to be received. In those embodiments, the previously received serialized message may not include a payload or may include a blank text-encoded payload. If the recipient computing device 104 determines not to receive a serialized message, the method 500 loops back to block 502 to continue monitoring for serialized messages. If a serialized message is to be received, the method 500 advances to block 504, in which the recipient computing device 104 receives a serialized message from the source computing device 102. The recipient computing device 104 may receive the serialized message via the network 106 using any appropriate transmission protocol.

In some embodiments, in block 506 the recipient computing device 104 may verify a data protection block of the serialized message using a signature block of the serialized message. As described above, each of the data protection block and the signature block may be embodied as sections and/or fields of the serialized message. The recipient computing device 104 may load the data protection block and the serialized message block by parsing, indexing, interpreting, or otherwise accessing the associated section and/or field of the serialized message. As described above, the signature block includes a cryptographic signature generated over the data protection block. The recipient computing device 104 may use the cryptographic signature to verify the integrity and/or authenticity of the data protection block and therefore the included text-encoded payload and aggregated metadata). The recipient computing device 104 may use any cryptographic signature algorithm and associated cryptographic keys to verify the data protection block.

In block 508, in some embodiments the recipient computing device 104 may load user-supplied metadata from one or more corresponding metadata sections and/or fields of the serialized message. For example the recipient computing device 104 may load an identifier of the source computing device 102, an identifier of the recipient computing device 104, a date and/or time that the payload file was generated, a signature of the binary file payload, a command to be performed by the recipient, computing device 104 in relation to the payload, or other metadata. The recipient computing device 104 may load the metadata by parsing, indexing, interpreting, or otherwise accessing an associated section and/or field of the serialized message. The recipient computing device 104 may perform additional validity checks using the user-supplied metadata, for example by verifying the identifiers of the source computing device 102 and the recipient computing device 104.

In block 510, the recipient computing device 104 loads the text-encoded payload from the serialized message into the memory 144. The recipient computing device 104 may parse, index, interpret, or otherwise access the text-encoded payload in a payload section and/or field of the serialized message without de-serializing the entire serialized message or otherwise loading the entire serialized message into memory. The particular techniques used to load the text-encoded payload depend on the serialization format of the serialized message.

In block 512, the recipient computing device 104 decodes the text-encoded payload to recover the binary file payload. The recipient computing device 104 may use any appropriate technique for converting the text representation into a binary file, such as base-64, uudecode, or other techniques. In some embodiments, in block 514 the recipient computing device 104 may decrypt the binary file payload after decoding the text-encoded representation. For example, the recipient computing device 104 may decode the text-encoded representation to generate an encrypted payload, which is binary-encoded, and then decrypt the encrypted payload to recover the binary file payload, which is also binary-encoded. In some embodiments, in block 516 the recipient computing device 104 may decrypt the text-encoded representation prior to generating the binary file payload. For example, the recipient computing device 104 may decrypt the text-encoded representation to generate an unencrypted text-encoded representation, which the recipient computing device 104 may then decode to generate the binary file payload. To decrypt the text-encoded representation, the recipient computing device 104 may use any decryption technique that accepts text-encoded cipher text input and generates text-encoded plaintext as output.

In block 518, the recipient computing device 104 the recipient computing device 104 loads the payload fingerprint from a payload fingerprint field of the serialized message. As described above in connection with block 510, the recipient computing device 104 may parse, index, interpret, or otherwise access the payload fingerprint field without de-serializing the entire serialized message or otherwise loading the entire serialized message into memory. After being loaded, the payload fingerprint may be resident in the memory 144 of the recipient computing device 104.

In block 520, the recipient computing device 104 verifies the binary file payload using the payload fingerprint. For example, the recipient computing device 104 may profile the binary file payload to generate a fingerprint, as described above in connection with block 304 of FIG. 3, and compare the generated fingerprint to the payload fingerprint loaded from the serialized message. If the fingerprints match, then the binary file payload may be verified, if the binary file payload is verified, the recipient computing device 104 may install or otherwise use the binary file payload. For example, in some embodiments, the recipient computing device 104 may perform an operation identified by a command included in the user-supplied metadata. After verifying the binary file payload, the method 500 loops back to block 502, in which the recipient computing device 104 may receive and process additional serialized messages.

EXAMPLES

Illustrative examples of the technologies disclosed herein are provided below. An embodiment of the technologies may include any one or more, and any combination of, the examples described below.

Example 1 includes a computing device for binary data distribution, the computing device comprising: a profiler module to profile a binary file payload to generate a payload fingerprint; an encoder module to generate a text-encoded payload as a function of the binary file payload, wherein the text-encoded payload is a text representation of the binary file payload; a metadata aggregator module to combine the text-encoded payload and the payload fingerprint to generate a message data structure; a serializer module to serialize the message data structure to generate a serialized message; and a communication module to transmit the serialized message to a recipient computing device.

Example 2 includes the subject matter of Example 1, and wherein: the metadata aggregator module is further to combine the payload fingerprint with user-supplied metadata to generate aggregated metadata; wherein to combine the text-encoded payload and the payload fingerprint comprises to combine the text-encoded payload and the user-supplied metadata.

Example 3 includes the subject matter of any of Examples 1 and 2, and wherein the user-supplied metadata comprises an identifier of the recipient computing device, an identifier of the computing device, a date of generation, or a command associated with the binary file payload.

Example 4 includes the subject matter of any of Examples 1-3, and wherein to combine the text-encoded payload and the payload fingerprint to generate the message data structure comprises to: combine the text-encoded payload and the payload fingerprint to generate a data protection block; sign over the data protection block to generate a cryptographic signature of the data protection block; store the cryptographic signature in a signature block; and combine the data protection block and the signature block to generate the message data structure.

Example 5 includes the subject matter of any of Examples 1-4, and wherein: the encoder module is further to encrypt the binary file payload to generate an encrypted payload; and to generate the text-encoded payload as a function of the binary file payload comprises to generate the text-encoded payload as a function of the encrypted payload, wherein the text-encoded payload is a text representation of the encrypted payload.

Example 6 includes the subject matter of any of Examples 1-5, and wherein: the encoder module is further to encrypt the text-encoded payload to generate an encrypted text-encoded payload; and to combine the text-encoded payload and the payload fingerprint to generate the message data structure comprises to combine the encrypted text-encoded payload and the payload fingerprint to generate the message data structure.

Example 7 includes a computing device for binary data distribution, the computing device comprising: a communication module to receive a serialized message from a source computing device; a deserializer module to (i) load a text-encoded payload into memory of the computing device from a payload field of the serialized message and (ii) load a payload fingerprint into the memory of the computing device from a payload fingerprint field of the serialized message; a decoder module to decode the text-encoded payload to recover a binary file payload in response to loading of the text-encoded payload; and a verifier module to verify the binary file payload with the payload fingerprint.

Example 8 includes the subject matter of Example 7, and wherein to verify the binary file payload using the payload fingerprint comprises to: profile the binary file payload to generate a second payload fingerprint; and compare the payload fingerprint to the second payload fingerprint.

Example 9 includes the subject matter of any of Examples 7 and 8, and wherein the verifier module is further to verify a data protection block of the serialized message with a signature block of the serialized message, wherein the data protection block comprises the text-encoded payload field and the payload fingerprint field, and wherein the signature block comprises a cryptographic signature generated from data of the data protection block.

Example 10 includes the subject matter of any of Examples 7-9, and wherein to decode the text-encoded payload to recover the binary file payload comprises to: decode the text-encoded payload to generate an encrypted payload; and decrypt the encrypted payload to recover the binary file payload.

Example 11 includes the subject matter of any of Examples 7-10, and wherein to decode the text-encoded payload to recover the binary file payload comprises to: decrypt the text-encoded payload to generate a decrypted text-encoded payload; and decode the decrypted text-encoded payload to recover the binary file payload.

Example 12 includes the subject matter of any of Examples 7-11, and wherein the deserializer module is further to load user-supplied metadata into the memory of the computing device from a user-supplied metadata field of the serialized message.

Example 13 includes the subject matter of any of Examples 7-12, and wherein the user-supplied metadata comprises an identifier of the computing device, an identifier of the source computing device, a date of generation, or a command associated with the binary file payload.

Example 14 includes a method for binary data distribution, the method comprising: profiling, by a computing device, a binary file payload to generate a payload fingerprint; generating, by the computing device, a text-encoded payload as a function of the binary file payload, wherein the text-encoded payload is a text representation of the binary file payload; combining, by the computing device, the text-encoded payload and the payload fingerprint to generate a message data structure; serializing, by the computing device, the message data structure to generate a serialized message; and transmitting, by the computing device, the serialized message to a recipient computing device.

Example 15 includes the subject matter of Example 14, and further comprising: combining, by the computing device, the payload fingerprint with user-supplied metadata to generate aggregated metadata; wherein combining the text-encoded payload and the payload fingerprint comprises combining the text-encoded payload and the user-supplied metadata.

Example 16 includes the subject matter of any of Examples 14 and 15, and wherein the user-supplied metadata comprises an identifier of the recipient computing device, an identifier of the computing device, a date of generation, or a command associated with the binary file payload.

Example 17 includes the subject matter of any of Examples 14-16, and wherein combining the text-encoded payload and the payload fingerprint to generate the message data structure comprises: combining the text-encoded payload and the payload fingerprint to generate a data protection block; signing over the data protection block to generate a cryptographic signature of the data protection block; storing the cryptographic signature in a signature block; and combining the data protection block and the signature block to generate the message data structure.

Example 18 includes the subject matter of any of Examples 14-17, and further comprising: encrypting, by the computing device, the binary file payload to generate an encrypted payload; wherein generating the text-encoded payload as a function of the binary file payload comprises generating the text-encoded payload as a function of the encrypted payload, wherein the text-encoded payload is a text representation of the encrypted payload.

Example 19 includes the subject matter of any of Examples 14-18, and further comprising: encrypting, by the computing device, the text-encoded payload to generate an encrypted text-encoded payload; wherein combining the text-encoded payload and the payload fingerprint to generate the message data structure comprises combining the encrypted text-encoded payload and the payload fingerprint to generate the message data structure.

Example 20 includes a method for binary data distribution, the method comprising: receiving, by a computing device, a serialized message from a source computing device; loading, by the computing device, a text-encoded payload into memory of the computing device from a payload field of the serialized message; decoding, by the computing device, the text-encoded payload to recover a binary file payload in response to loading the text-encoded payload; loading, by the computing device, a payload fingerprint into the memory of the computing device from a payload fingerprint field of the serialized message; and verifying, by the computing device, the binary file payload using the payload fingerprint.

Example 21 includes the subject matter of Example 20, and wherein verifying the binary file payload using the payload fingerprint comprises: profiling the binary file payload to generate a second payload fingerprint; and comparing the payload fingerprint to the second payload fingerprint.

Example 22 includes the subject matter of any of Examples 20 and 21, and further comprising verifying, by the computing device, a data protection block of the serialized message with a signature block of the serialized message, wherein the data protection block comprises the text-encoded payload field and the payload fingerprint field, and wherein the signature block comprises a cryptographic signature generated from data of the data protection block.

Example 23 includes the subject matter of any of Examples 20-22, and wherein decoding the text-encoded payload to recover the binary file payload comprises: decoding the text-encoded payload to generate an encrypted payload; and decrypting the encrypted payload to recover the binary file payload.

Example 24 includes the subject matter of any of Examples 20-23, and wherein decoding the text-encoded payload to recover the binary file payload comprises: decrypting the text-encoded payload to generate a decrypted text-encoded payload; and decoding the decrypted text-encoded payload to recover the binary file payload.

Example 25 includes the subject matter of any of Examples 20-24, and further comprising loading, by the computing device, user-supplied metadata into the memory of the computing device from a user-supplied metadata field of the serialized message.

Example 26 includes the subject matter of any of Examples 20-25, and wherein the user-supplied metadata comprises an identifier of the computing device, an identifier of the source computing device, a date of generation, or a command associated with the binary file payload.

Example 27 includes a computing device comprising: a processor; and a memory having stored therein a plurality of instructions that when executed by the processor cause the computing device to perform the method of any of Examples 14-26.

Example 28 includes one or more machine readable storage media comprising a plurality of instructions stored thereon that in response to being executed result in a computing device performing the method of any of Examples 14-26.

Example 29 includes a computing device comprising means for performing the method of any of Examples 14-26.

Example 30 includes a computing device for binary data distribution, the computing device comprising: means for profiling a binary file payload to generate a payload fingerprint; means for generating a text-encoded payload as a function of the binary file payload, wherein the text-encoded payload is a text representation of the binary file payload; means for combining the text-encoded payload and the payload fingerprint to generate a message data structure; means for serializing the message data structure to generate a serialized message; and means for transmitting the serialized message to a recipient computing device.

Example 31 includes the subject matter of Example 30, and further comprising: means for combining the payload fingerprint with user-supplied metadata to generate aggregated metadata; wherein the means for combining the text-encoded payload and the payload fingerprint comprises means for combining the text-encoded payload and the user-supplied metadata.

Example 32 includes the subject matter of any of Examples 30 and 31, and wherein the user-supplied metadata comprises an identifier of the recipient computing device, an identifier of the computing device, a date of generation, or a command associated with the binary file payload.

Example 33 includes the subject matter of any of Examples 30-32, and wherein the means for combining the text-encoded payload and the payload fingerprint to generate the message data structure comprises: means for combining the text-encoded payload and the payload fingerprint to generate a data protection block; means for signing over the data protection block to generate a cryptographic signature of the data protection block; means for storing the cryptographic signature in a signature block; and means for combining the data protection block and the signature block to generate the message data structure.

Example 34 includes the subject matter of any of Examples 30-33, and further comprising: means for encrypting the binary file payload to generate an encrypted payload; wherein the means for generating the text-encoded payload as a function of the binary file payload comprises means for generating the text-encoded payload as a function of the encrypted payload, wherein the text-encoded payload is a text representation of the encrypted payload.

Example 35 includes the subject matter of any of Examples 30-34, and further comprising: means for encrypting the text-encoded payload to generate an encrypted text-encoded payload; wherein the means for combining the text-encoded payload and the payload fingerprint to generate the message data structure comprises means for combining the encrypted text-encoded payload and the payload fingerprint to generate the message data structure.

Example 36 includes a computing device for binary data distribution, the computing device comprising: means for receiving a serialized message from a source computing device; means for loading a text-encoded payload into memory of the computing device from a payload field of the serialized message; means for decoding the text-encoded payload to recover a binary file payload in response to loading the text-encoded payload; means for loading a payload fingerprint into the memory of the computing device from a payload fingerprint field of the serialized message; and means for verifying the binary file payload using the payload fingerprint.

Example 37 includes the subject matter of Example 36, and wherein the means for verifying the binary file payload using the payload fingerprint comprises: means for profiling the binary file payload to generate a second payload fingerprint; and means for comparing the payload fingerprint to the second payload fingerprint.

Example 38 includes the subject matter of any of Examples 36 and 37, and further comprising means for verifying a data protection block of the serialized message with a signature block of the serialized message, wherein the data protection block comprises the text-encoded payload field and the payload fingerprint field, and wherein the signature block comprises a cryptographic signature generated from data of the data protection block.

Example 39 includes the subject matter of any of Examples 36-38, and wherein the means for decoding the text-encoded payload to recover the binary file payload comprises: means for decoding the text-encoded payload to generate an encrypted payload; and means for decrypting the encrypted payload to recover the binary file payload.

Example 40 includes the subject matter of any of Examples 36-39, and wherein the means for decoding the text-encoded payload to recover the binary file payload comprises: means for decrypting the text-encoded payload to generate a decrypted text-encoded payload; and means for decoding the decrypted text-encoded payload to recover the binary file payload.

Example 41 includes the subject matter of any of Examples 36-40, and further comprising means for loading user-supplied metadata into the memory of the computing device from a user-supplied metadata field of the serialized message.

Example 42 includes the subject matter of any of Examples 36-41, and wherein the user-supplied metadata comprises an identifier of the computing device, an identifier of the source computing device, a date of generation, or a command associated with the binary file payload.

Example 43 includes a computing device for binary data distribution, the computing device comprising a processor; and a memory having stored therein a plurality of instructions that when executed by the processor cause the computing device to: profile a binary file payload to generate a payload fingerprint; generate a text-encoded payload as a function of the binary file payload, wherein the text-encoded payload is a text representation of the binary file payload; combine the text-encoded payload and the payload fingerprint to generate a message data structure; serialize the message data structure to generate a serialized message; and transmit the serialized message to a recipient computing device.

Example 44 includes the subject matter of Example 43, and wherein the memory further has stored therein a plurality of instructions that when executed by the processor cause the computing device to combine the payload fingerprint with user-supplied metadata to generate aggregated metadata; wherein to combine the text-encoded payload and the payload fingerprint comprises to combine the text-encoded payload and the user-supplied metadata.

Example 45 includes the subject matter of any of Examples 43 and 44, and wherein the user-supplied metadata comprises an identifier of the recipient computing device, an identifier of the computing device, a date of generation, or a command associated with the binary file payload.

Example 46 includes the subject matter of any of Examples 43-45, and wherein to combine the text-encoded payload and the payload fingerprint to generate the message data structure comprises to combine the text-encoded payload and the payload fingerprint to generate a data protection block; sign over the data protection block to generate a cryptographic signature of the data protection block; store the cryptographic signature in a signature block; and combine the data protection block and the signature block to generate the message data structure.

Example 47 includes the subject matter of any of Examples 43-46, and wherein the memory further has stored therein a plurality of instructions that when executed by the processor cause the computing device to encrypt the binary file payload to generate an encrypted payload; and to generate the text-encoded payload as a function of the binary file payload comprises to generate the text-encoded payload as a function of the encrypted payload, wherein the text-encoded payload is a text representation of the encrypted payload.

Example 48 includes the subject matter of any of Examples 43-47, and wherein the memory further has stored therein a plurality of instructions that when executed by the processor cause the computing device to encrypt the text-encoded payload to generate an encrypted text-encoded payload; and to combine the text-encoded payload and the payload fingerprint to generate the message data structure comprises to combine the encrypted text-encoded payload and the payload fingerprint to generate the message data structure.

Example 49 includes a computing device for binary data distribution, the computing device comprising a processor; and a memory having stored therein a plurality of instructions that when executed by the processor cause the computing device to: receive a serialized message from a source computing device; load a text-encoded payload into memory of the computing device from a payload field of the serialized message; load a payload fingerprint into the memory of the computing device from a payload fingerprint field of the serialized message; recover a binary file payload in response to loading of the text-encoded payload; and verify the binary file payload with the payload fingerprint.

Example 50 includes the subject matter of Example 49, and wherein to verify the binary file payload using the payload fingerprint comprises to profile the binary file payload to generate a second payload fingerprint; and compare the payload fingerprint to the second payload fingerprint.

Example 51 includes the subject matter of any of Examples 49 and 50, and wherein the memory further has stored therein a plurality of instructions that when executed by the processor cause the computing device to verify a data protection block of the serialized message with a signature block of the serialized message, wherein the data protection block comprises the text-encoded payload field and the payload fingerprint field, and wherein the signature block comprises a cryptographic signature generated from data of the data protection block.

Example 52 includes the subject matter of any of Examples 49-51, and wherein to decode the text-encoded payload to recover the binary file payload comprises to decode the text-encoded payload to generate an encrypted payload; and decrypt the encrypted payload to recover the binary file payload.

Example 53 includes the subject matter of any of Examples 49-52, and wherein to decode the text-encoded payload to recover the binary file payload comprises to decrypt the text-encoded payload to generate a decrypted text-encoded payload; and decode the decrypted text-encoded payload to recover the binary file payload.

Example 54 includes the subject matter of any of Examples 49-53, and wherein the memory further has stored therein a plurality of instructions that when executed by the processor cause the computing device to load user-supplied metadata into the memory of the computing device from a user-supplied metadata field of the serialized message.

Example 55 includes the subject matter of any of Examples 49-54, and wherein the user-supplied metadata comprises an identifier of the computing device, an identifier of the source computing device, a date of generation, or a command associated with the binary file payload.

What is claimed is:

1. An apparatus comprising:
   at least one memory;
   instructions; and
   processor circuitry to execute the instructions to:
      decrypt a data protection block of a serialized message, the data protection block including a text-encoded payload, metadata, and a first payload fingerprint;
      decode the text-encoded payload to generate a binary file payload;
      hash the binary file payload to generate a second payload fingerprint; and
      verify the first payload fingerprint matches the second payload fingerprint.

2. The apparatus of claim 1, wherein the processor circuitry is to execute the instructions to access the first payload fingerprint from a partially loaded serialized message.

3. The apparatus of claim 1, wherein the metadata includes a command associated with the binary file payload.

4. The apparatus of claim 3, wherein the metadata is a user-supplied metadata.

5. The apparatus of claim 1, wherein the metadata includes a first identifier of a source computing device, and wherein the processor circuitry is to execute the instructions to compare the first identifier with a second identifier associated with a receiving computing device.

6. The apparatus of claim 1, wherein to decode the text-encoded payload to generate the binary file payload, the processor circuitry is to execute the instructions to:
   decode the text-encoded payload to generate an encrypted payload; and
   decrypt the encrypted payload to generate the binary file payload.

7. The apparatus of claim 1, wherein to decode the text-encoded payload to generate the binary file payload, the processor circuitry is to execute the instructions to:
   decrypt the text-encoded payload to generate a decrypted text-encoded payload; and
   decode the decrypted text-encoded payload to generate the binary file payload.

8. The apparatus of claim 1, wherein the processor circuitry is to serialize the serialized message in at least one of javascript object notation or extensible markup language.

9. A non-transitory computer readable medium comprising instructions which, when executed, cause processor circuitry to at least:
   decrypt a data protection block of a serialized message, the data protection block including a text-encoded payload, metadata, and a first payload fingerprint;
   decode the text-encoded payload to generate a binary file payload;
   hash the binary file payload to generate a second payload fingerprint; and
   verify the first payload fingerprint matches the second payload fingerprint.

10. The non-transitory computer readable medium of claim 9, wherein the instructions, when executed, cause the processor circuitry to access the first payload fingerprint from a partially loaded serialized message.

11. The non-transitory computer readable medium of claim 9, wherein the metadata includes a command associated with the binary file payload.

12. The non-transitory computer readable medium of claim 11, wherein the metadata is a user-supplied metadata.

13. The non-transitory computer readable medium of claim 9 wherein the metadata includes a first identifier of a source computing device, and wherein the instructions, when executed, cause the processor circuitry to compare the first identifier with a second identifier associated with a receiving computing device.

14. The non-transitory computer readable medium of claim 9, wherein the instructions, when executed, cause the processor circuitry to:
   decode the text-encoded payload to generate an encrypted payload; and
   decrypt the encrypted payload to generate the binary file payload.

15. The non-transitory computer readable medium of claim 9, wherein the instructions, when executed, cause the processor circuitry to:
   decrypt the text-encoded payload to generate a decrypted text-encoded payload; and
   decode the decrypted text-encoded payload to generate the binary file payload.

16. The non-transitory computer readable medium of claim 9, wherein the instructions, when executed, cause the processor circuitry to serialize the serialized message in at least one of javascript object notation or extensible markup language.

17. A method comprising:
   decrypting, by executing an instruction with processor circuitry, a data protection block of a serialized message, the data protection block including a text-encoded payload, metadata, and a first payload fingerprint;
   decoding, by executing an instruction with the processor circuitry, the text-encoded payload to generate a binary file payload;

hashing, by executing an instruction with the processor circuitry, the binary file payload to generate a second payload fingerprint; and verifying, by executing an instruction with the processor circuitry, the first payload fingerprint matches the second payload fingerprint.

18. The method of claim 17, further including accessing the first payload fingerprint from a partially loaded serialized message.

19. The method of claim 17, wherein the metadata includes a command associated with the binary file payload.

20. The method of claim 17, wherein the metadata is a user-supplied metadata.

* * * * *